(12) United States Patent
Xue et al.

(10) Patent No.: US 12,470,720 B2
(45) Date of Patent: Nov. 11, 2025

(54) CONTENT ADAPTIVE BOUNDARY PLACEMENT FOR DISTRIBUTED ENCODES

(71) Applicant: Disney Enterprises, Inc., Burbank, CA (US)

(72) Inventors: Yuanyi Xue, Kensington, CA (US); Erika Elizabeth Varis Doggett, Los Angeles, CA (US); Christopher R. Schroers, Zurich (CH); James D. Zimmerman, Rapid City, SD (US); Jared P. Mcphillen, Glendale, CA (US); Scott C. Labrozzi, Cary, NC (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/835,079

(22) Filed: Mar. 30, 2020

(65) Prior Publication Data
US 2021/0076045 A1    Mar. 11, 2021

Related U.S. Application Data (60) Provisional application No. 62/898,758, filed on Sep. 11, 2019.

(51) Int. Cl.
| | | |
|---|---|---|
| *H04N 19/82* | (2014.01) | |
| *H04N 19/115* | (2014.01) | |
| *H04N 19/14* | (2014.01) | |
| *H04N 19/177* | (2014.01) | |
| *H04N 19/40* | (2014.01) | |
| *H04N 19/436* | (2014.01) | |

(52) U.S. Cl.
CPC .......... *H04N 19/14* (2014.11); *H04N 19/115* (2014.11); *H04N 19/177* (2014.11); *H04N 19/40* (2014.11); *H04N 19/436* (2014.11)

(58) Field of Classification Search
CPC .... H04N 19/14; H04N 19/115; H04N 19/177; H04N 19/40; H04N 19/436
USPC ..................................................... 375/240.02
See application file for complete search history.

(56) References Cited

U.S. PATENT DOCUMENTS

2015/0189222 A1 * 7/2015 John ................ H04N 21/44008
    348/441
2016/0073106 A1 * 3/2016 Su ...................... H04N 21/8456
    375/240.02

(Continued)

*Primary Examiner* — Patrick E Demosky
(74) *Attorney, Agent, or Firm* — Patterson + Sheridan, LLP; Gero G. McClellan (57) ABSTRACT

Chunk based video encoding involves dividing a video into chunks with varying lengths based on the content within those frames. In contrast, dividing the video at a fix interval is prone to generating chunks starting at the middle of hard to encode areas, which can lead to a loss of encoder rate-control efficiency and produce visual quality gaps at the beginning of such chunks. The system can identify a set of boundaries for dividing the video into chunks having similar lengths and with little to no impact on visual quality. The boundaries of the chunks are placed at locations (or frames) that are far from the complex (or hard to encode) areas of the video. To do so, the system evaluates the video using various complexity metrics to identify the complex areas that require more bits to encode relative to less complex areas.

13 Claims, 7 Drawing Sheets

(56) References Cited

U.S. PATENT DOCUMENTS

2017/0201752 A1* 7/2017 Wang ................... H04N 19/137
2018/0338146 A1* 11/2018 John ................... H04N 19/112

* cited by examiner

CONTENT ADAPTIVE BOUNDARY PLACEMENT FOR DISTRIBUTED ENCODES

CROSS-REFERENCE TO RELATED APPLICATIONS

This application claims benefit of U.S. provisional patent application Ser. No. 62/898,758 filed Sep. 11, 2019 which is herein incorporated by reference in its entirety.

BACKGROUND

A video stream includes a series of video frames. A set of frames may be referred to as a segment. Segments are generally of equal length, but there may be exceptions. Segments denote, for example, places where the video can be interrupted (e.g., to insert a commercial).

Chunk-based video encoding involves dividing the frames in a video into groups called "chunks" that may be encoded (i.e., compressed) by a single transcoder, or separately by multiple transcoders (i.e. "separate nodes") in parallel. A basic approach is to divide a video into chunks having equal length and then encode the chunks in parallel using different transcoders.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Embodiments herein describe dividing a video into chunks with varying lengths based on the content within those frames. Dividing chunks into the same length ignores the fact that the complexity or difficulty of performing encoding can change. That is, some chunks may have complex content which requires significantly more bits to encode into a new format than other chunks that have less complex content. Dividing the video at a fixed interval is prone to generating chunks starting at the middle of hard to encode areas, which can lead to a loss of encoder rate-control efficiency and produce visual quality gaps at the beginning of such chunks. The embodiments herein can identify a set of boundaries for dividing the video into chunks having similar (but often not identical) lengths and with little to no impact on visual quality.

In one embodiment, the boundaries of the chunks are placed at locations (or frames) that are far from the complex (or hard to encode) areas of the video. To do so, the system evaluates the video using one or more complexity metrics (e.g., average luminance, variance of luminance, frame difference, histogram difference, encoder analysis data from an initial encode pass and resultant initial encode statistics, or combinations thereof) to identify the complex areas (referred to as hot spots) that require more bits to encode relative to less complex areas (referred to as cool spots). Once identified, the system can evaluate each frame to determine its distance from the hot spots. The system can then use various techniques for identifying optimal frames in the cool areas that can serve as the boundaries of the chunks. While these chunks may have different lengths or durations, the embodiments herein can also harmonize chunk durations so that different chunks are more or less of equal sizes to maximize the advantage of using multiple transcoders to encode the chunks in parallel. However, it is not necessary that the chucks are exactly of equal sizes and it may be advantageous to allow the chunks to vary somewhat in order to use frames in cool areas as the start/end boundaries of the chunks.

Figure 1:
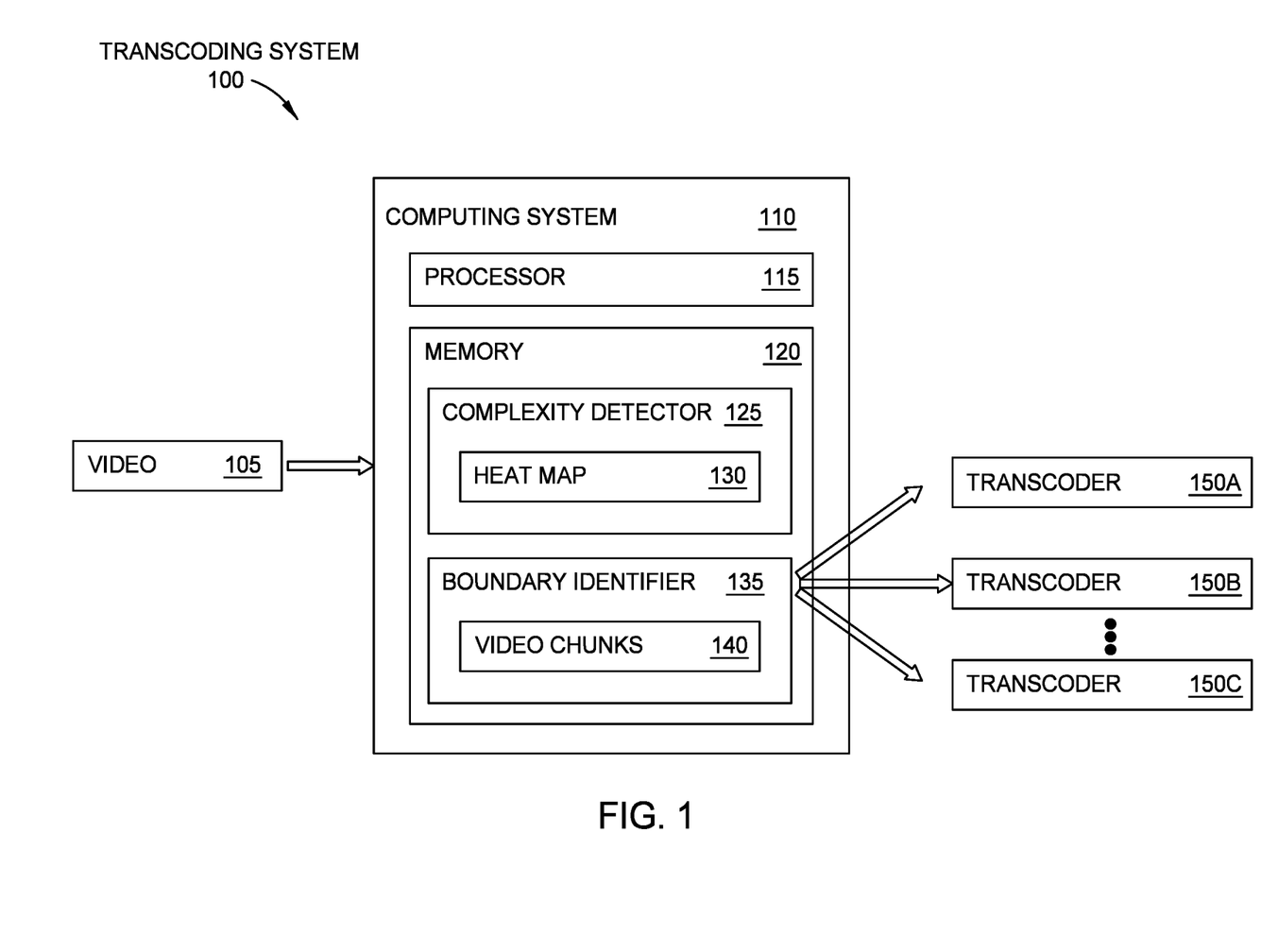
FIG. 1 is a block diagram of a transcoding system, according to one embodiment described herein.

FIG. 1 is a block diagram of a transcoding system 100, according to one embodiment described herein. The transcoding system 100 includes a computing system 110 that receives a video 105 that it divides into a plurality of chunks 140. These chunks 140 are then transmitted to multiple transcoders 150A-C to be encoded in parallel. The transcoders 150 can be implemented to conform a specific video coding standard such as an HEVC/H.265 encoder or a AVC/H.264 encoder. The transcoders 150 may convert the respective chunks 140 of the video 105 from one encoding format to another. This may be done where the target device does not support the original format of the video 105 or has limited storage capacity. For example, transcoding may be performed before the video 105 is streamed through a content provider to a user device (e.g., a smart TV, mobile phone, tablet, etc.).

Encoding the chunks 140 in parallel can reduce the overall encoding time. However, as mentioned above, dividing the video 105 into chunks of equal length can result in the loss of encoder rate-control efficiency and produce visual quality gaps between the chunks 140. Instead of using chunks 140 of fixed length, the computing system 110 identifies optimal boundaries for the chunks 140 that avoid complex or hot spots in the video (e.g., portions of the video that are hard to encode). As a result, after encoding, the chunks 140 can be concatenated (or merged) together without any loss of encoder rate-control efficiency and without visual quality gaps.

The computing system 110 includes a processor 115 which can represent any number of processing elements that each can include any number of processing cores. The computing system 110 also includes memory 120 (e.g., volatile or non-volatile memory elements) that stores a complexity detector 125 and a boundary identifier 135. In one embodiment, the complexity detector 125 and the boundary identifier 135 are software applications, but in other embodiments they may be firmware, hardware, or combinations of software, firmware, and hardware.

The complexity detector 125 derives one or more complexity metrics by evaluating the frames in the video 105. For example, the complexity detector 125 can generate metrics about the video 105 such as average luminance, variance of luminance, frame difference, and histogram difference. In general, the complexity metrics represent the complexity of encoding the frames using a transcoder, such as complex spatial or temporal activity in the frames. The complexity detector 125 can use the complexity metrics to determine whether each frame corresponds to low motion or spatial activity or not. In one embodiment, the complexity detector 125 uses the complexity metrics to derive a heat map 130 of the video 105 that identifies the cool spots (where encoding the video is easy and compression results in fewer bits) and hot spots (where encoding is more complex and compression results in more bits). Stated differently, the complexity metrics can identify groups of frames in the video 105 which are likely difficult to encode requiring more bits and groups of frames that are likely easier to encode requiring fewer bits. These groups can be labeled as cool spots and hot spots in the heat map 130.

The boundary identifier 135 uses the metrics derived by the complexity detector to generate the video chunks 140. In one embodiment, the boundary identifier 135 attempts to locate the boundaries of the chunks 140 in the cool spots of the heat map 130 where a video buffer verifier (VBV) utilization is low. Generally, the VBV utilization describes that rate at which bits are being received by a decoder relative to the bits being generated by the transcoders 150. If the VBV utilization is the same at the beginning and end of the chunks 140, then the encoder rate-control efficiency is consistent between the chunks 140 and there are little to no visual quality gaps between the chunks 140. On the other hand, placing chunk boundaries in hot spots might result in the encoder rate-control starting at an area where VBV utilization is already high, thus negatively affecting the efficiency of the encoder rate-control algorithm.

In one embodiment, the boundary identifier 135 attempts to locate the boundaries in the middle of a cool spot—e.g., at a frame that is the furthest (in forward and reverse directions) from a hot spot in the heat map 130. However, this parameter may be balanced with the desire that the durations of the chunks be similar. For example, if one chunk has a duration of five minutes but another chunk is only thirty seconds, the time advantage of parallelizing the encoding of these chunks using the transcoders 150 is reduced since one transcoder will, in general, take much longer to complete than the other. Further, if the chunk duration is too short, the encoder rate-control is also not operating at its optimal operation condition. To maximize the time benefits of encoding the chunks 140 in parallel, the boundary identifier 135 can also use chunk duration as a parameter when selecting the boundaries.

Once the boundary identifier 135 uses the boundaries to divide the video 105 into the chunks 140, these chunks 140 are sent to the transcoders 150 which can execute in parallel. A merging application (not shown) can merge the encoded chunks 140 back into a single video 105 which is then transmitted to a downstream target device (e.g., a streaming consumer or a storage module). In one embodiment, the transcoding system 100 is part of a content delivery network that prepares and delivers content to remote user devices, but this is only one example. The transcoding system 100 can be used in any system where videos are first converted into a different encoding before being transmitted to a target device.

In one embodiment, a multi-pass transcoder pipeline is used where the transcoders 150 perform two or more encode passes. In this embodiment, during the first pass the transcoders 150 perform a non-chunk fast analysis pass. The first pass is usually a fast, single low-res encode that analyzes encoding aspects such as bit allocation and decisions related to rate-distortion optimization. The encode pass produces statistics that can be analyzed to determine content complexity. The boundary identifier 135 can process the encode pass statistics and use these statistics to determine chunk boundaries. In another embodiment, both the encode pass statistics derived from the encode pass and the complexity metrics from the complexity detector 125 are used in combination to determine optimal chunk boundaries. Stated differently, in some embodiments, the boundary identifier 135 uses only the complexity metrics or only the encode pass statistics to identify chunk boundaries. Alternatively, the boundary identifier 135 can use both the complexity metrics and the encode pass statistics in combination to identify chunk boundaries.

Figure 2:
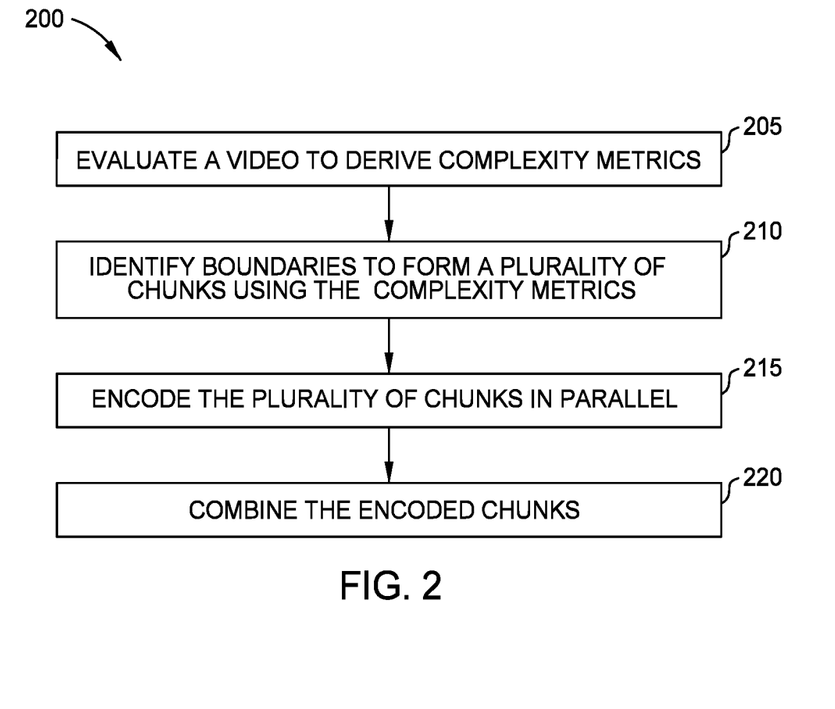
FIG. 2 is a flowchart for identifying boundaries for dividing a video into chunks, according to one embodiment described herein.

FIG. 2 is a flowchart of a method 200 for identifying boundaries for dividing a video into chunks, according to one embodiment described herein. At block 205, a complexity detector (e.g., the complexity detector 125 in FIG. 1) evaluates a video to derive one or more complexity metrics. In one embodiment, these complexity metrics are indicators of the complexity of the data in the underlying frames when performing encoding. By evaluating the complexity metrics, the complexity detector can accurately predict whether a portion of the video (e.g., a single frame or a group of sequential frames) will be difficult to encode (e.g., require a lot of bits and have a high VBV utilization) or will be easy to encode (e.g., require fewer bits and have a low VBV utilization). Generating and interpreting complexity metrics are described below in FIGS. 3A-3D and 4A-4D.

Figure 3A:
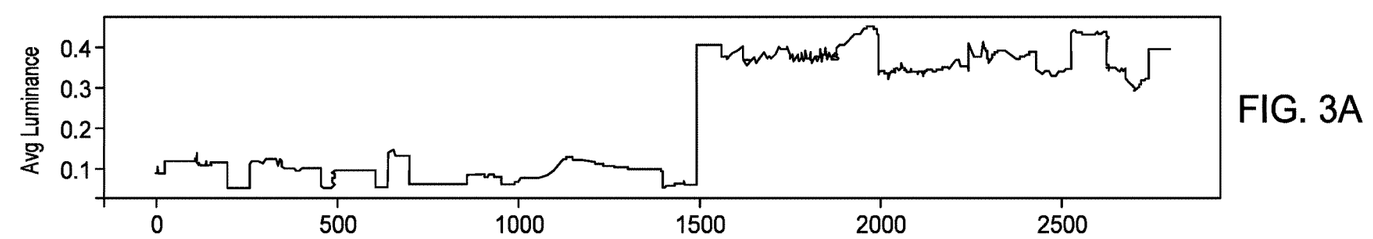
FIGS. 3A-3C illustrate tracking complexity metrics for a video, according to one embodiment described herein.
Figure 3B:
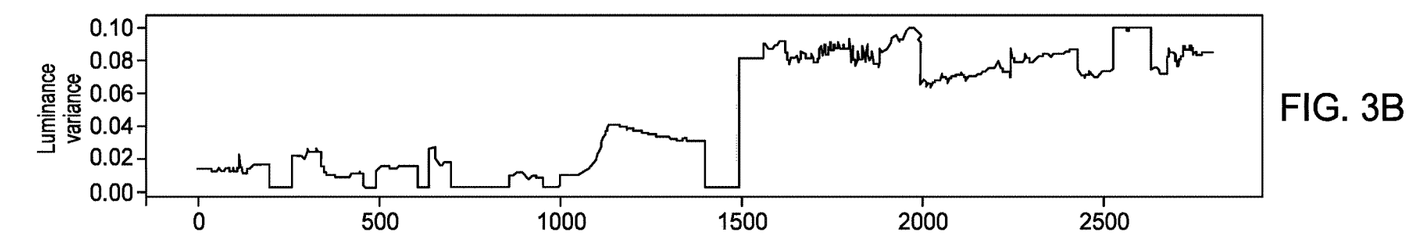
Figure 3C:
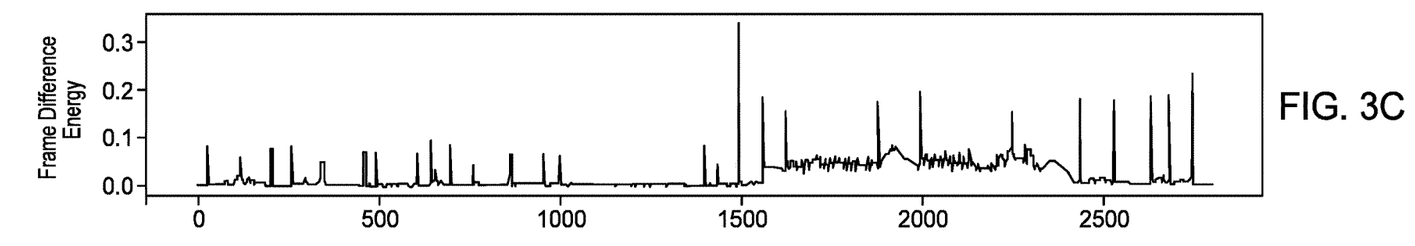

FIGS. 3A-3C illustrate tracking complexity metrics in a video, according to one embodiment described herein. Specifically, FIG. 3A illustrates the average luminance of a video, FIG. 3B illustrates the luminance variance in the same video, and FIG. 3C illustrates the frame difference energy in the same video.

The average luminance in FIG. 3A represents the general brightness of a scene in the video. The average luminance may identify a long/loose range in the video where the average brightness remains mostly constant. In one embodiment, the complexity detector calculates the average luminance by taking the Y-channel (in a YUV color encoding scheme) of the frames, computing the average, and normalizing the value from 0-1 for cross-comparison. As shown, the average luminance in FIG. 3A remains mostly constant for frames 0-1500 and in frames 1500-3000. In one embodiment, a group of frames with low average luminance values may indicate a cool spot while a group of frames with higher average luminance values indicates a hot spot in the video.

The variance of luminance in FIG. 3B indicates how dynamic the frame is, or the amount of contrast in the frame. The complexity detector can positively correlate the variance of luminance with fine spatial details in the frame, which in turn correlates to how many bits the transcoder would likely spend to encode the frame. The variance of luminance can be an indicator for spatial complexity in the frames of the video. In one embodiment, frames where the luminance variance is low may require fewer bits to encode than frames where the luminance variance is high.

The frame difference energy in FIG. 3C (also referred to as energy of one-step frame difference) represents the deviation in time between sequential frames and is often used for detecting a scene cut or scene change (e.g., when switching between cameras that have completely different views). In one embodiment, the complexity detector calculates the frame difference energy by determining a frame difference between two sequential or neighboring frames and computing the energy of the difference or delta. The frame difference energy may indicate large or abrupt motion between frames which correlates with complex temporal activity. A large spike in the frame difference energy can indicate when a scene change has occurred. It can also represent a boundary between scene changes which can in turn possibly indicate a transition from a cool spot to a hot spot (e.g., a change from a peaceful scene without a lot of action to a fighting scene with a lot of action).

In addition to the metrics above, the complexity detector may also extract frame by frame histograms and compute the differences between two histograms to generate a histogram difference. This metric may better represent the changes of the frames over time rather than just between two frames as is the case with the frame difference energy illustrated in FIG. 3C.

Figure 3D:
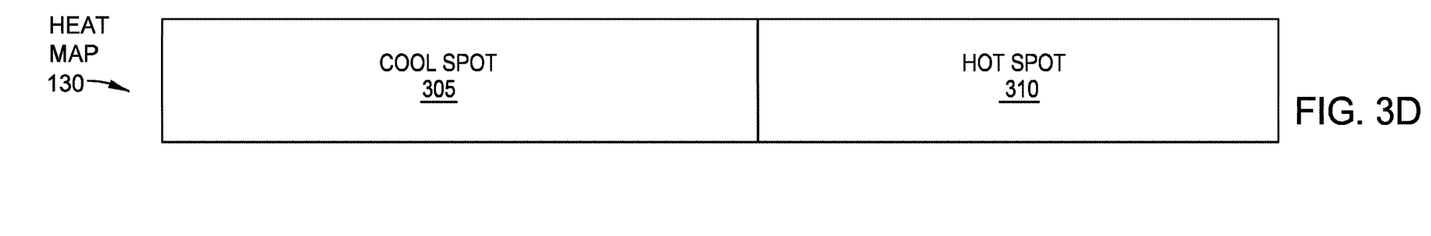
FIG. 3D illustrates a heatmap derived from the complexity metrics in FIGS. 3A-3C, according to one embodiment described herein.

FIG. 3D illustrates a heat map 130 where the complexity detector has evaluated one or more of the metrics described above to identify a first portion of the video that corresponds to a cool spot 305 and a second portion of the video that corresponds to a hot spot 310. In this example, the cool spot 305 corresponds to frames 0 to around 1500 while the hot spot corresponds to the frames 1500 to 3000.

Figure 4A:
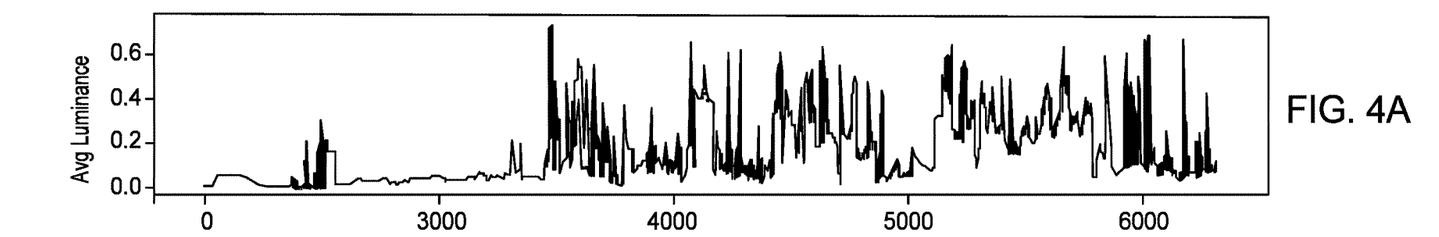
FIGS. 4A-4C illustrate tracking complexity metrics for a video, according to one embodiment described herein.
Figure 4B:
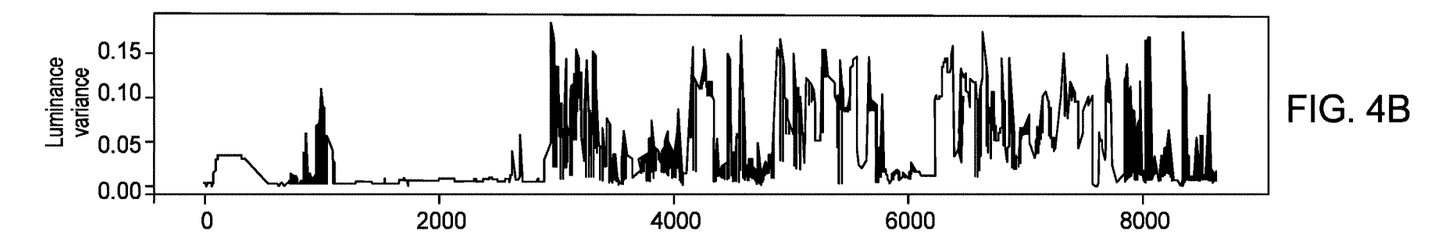
Figure 4C:
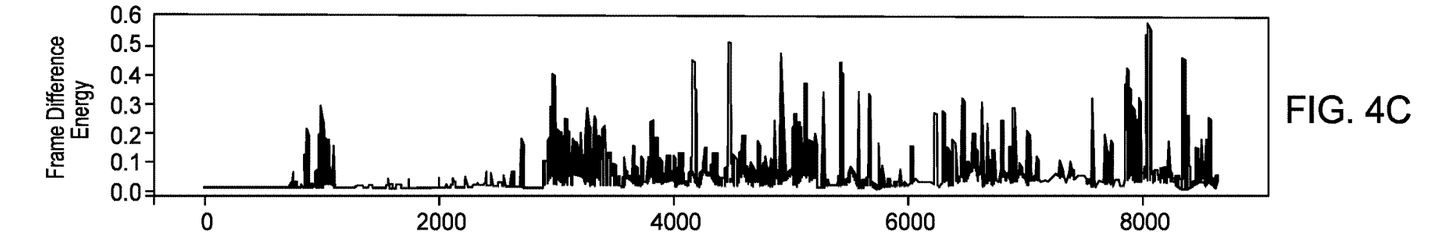

FIGS. 4A-4C illustrate tracking complexity metrics in a video, according to one embodiment described herein. Like FIGS. 3A-3C, FIG. 4A illustrates the average luminance of a video, FIG. 4B illustrates the luminance variance in the same video, and FIG. 4C illustrates the frame difference energy in the same video. The details of these complexity metrics are not repeated here.

In some implementations external encoding statistics data, output from an encoder performing a first pass encode (e.g., encoding statistics derived from an initial encode pass), may also be used as a complexity metric to evaluate the video's complexity. The information used from this statistics data includes, but is not limited to: quantization parameter fluctuation, rate factor, buffer states, macroblock encode times, and/or frame cost ratios. The information from within the encoding statistics data may be used in addition to or separately from the complexity metrics, to determine hot and/or cool area frame boundaries.

In some embodiments, the system could also use a machine-learning driven computer vision model to predict complexity (i.e., derive complexity metrics), based on previously identified complex and non-complex video training datasets, for example a binary or multi-class convolutional neural network for complexity categorization, or regressor neural network to produce a complexity measure on a spectrum.

Figure 4D:
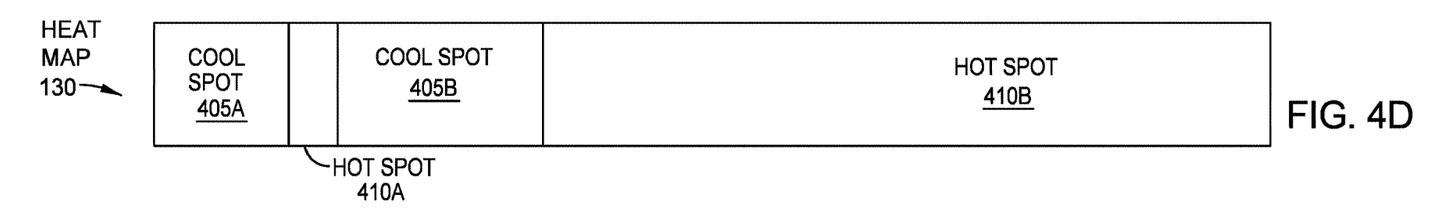
FIG. 4D illustrates a heatmap derived from the complexity metrics in FIGS. 4A-4C, according to one embodiment described herein.

FIG. 4D illustrates a heat map 130 where the complexity detector has evaluated one or more of the metrics illustrated in FIGS. 4A-4C to identify multiple cool spots 405 and multiple hot spots 405. That is, a first portion of the frames in the video corresponds to a cool spot 405A, the next portion of the video corresponds to a hot spot 410A, the next portion corresponds to a cool spot 405B, and the final portion corresponds to a hot spot 410B. These cool and hot spots correspond to the metrics in FIGS. 4A-4C which can be used to identify groups of frames where encoding is predicted to be difficult, as is the case in the hot spots 410, versus groups of frames where encoding is predicted to be easy, as is the case for the cool spots 405. The heat map 130 is merely one example of interpreting the metrics described above. While the complexity detector can generate the heat maps 130 illustrated in FIGS. 3D and 4D, this is not necessary. For example, the complexity detector may simply pass the complexity metrics directly to the boundary identifier as inputs, which the boundary identifier uses to identify the optimal location of the boundaries of the chunks.

Returning to the method 200, at block 210 the boundary identifier uses the complexity metrics to identify boundaries to form a plurality of chunks from the video. In one embodiment, the boundary identifier uses the complexity metrics to identify the distance of the frames from hot spots. Specifically, in one example, the boundary identifier identifies the middle frames in the cool spots—e.g., the frames that are furthest from the hot spots in the heat map 130 in FIG. 3D. To do so, the boundary identifier can calculate the distance from each frame to a hot spot in both the forwards and backwards direction (e.g., moving forward in a timeline of the video and moving backward in the timeline of the video). The frame that is equally distant from hot spots on either side of the cool spot is at the middle of the cool spot and may be a good location for the boundary. While the boundary identifier can use a heat map, this is not necessary. The boundary identifier can use the complexity metrics to identify the frame at the middle of the cool spots without the intermediate step of converting the complexity metrics into a heat map. For example, the boundary identifier can equally weight the metrics and compare the location of the current frame to any number of the complexity metrics to identify a portion of the video containing frames that are likely difficult to encode.

While the embodiments herein describe placing the boundaries within the cool spots, suitable results can be achieved by placing the boundaries within the hot spots although this might result in a poorer quality encode when compared to placing the boundaries within the cool spots. For example, placing the boundaries in the middle of the hot spots may also avoid a loss of visual quality when transitioning between chunks. So long as the VBV utilization is substantially constant at the end of one chunk and in the beginning of the next chunk (in contrast to the VBV utilization changing dramatically at the chunk boundaries), the visual quality is maintained.

In one embodiment, the boundary identifier also considers the duration of the chunk as a parameter when selecting the boundaries for the chunk. For example, the boundaries may be selected in a fixed range, or the boundary identifier may balance the distance of the frames from the hot spots to the duration of the chunk. In this manner, the duration of the chunks may be used to control the location of the boundaries.

Figure 6:
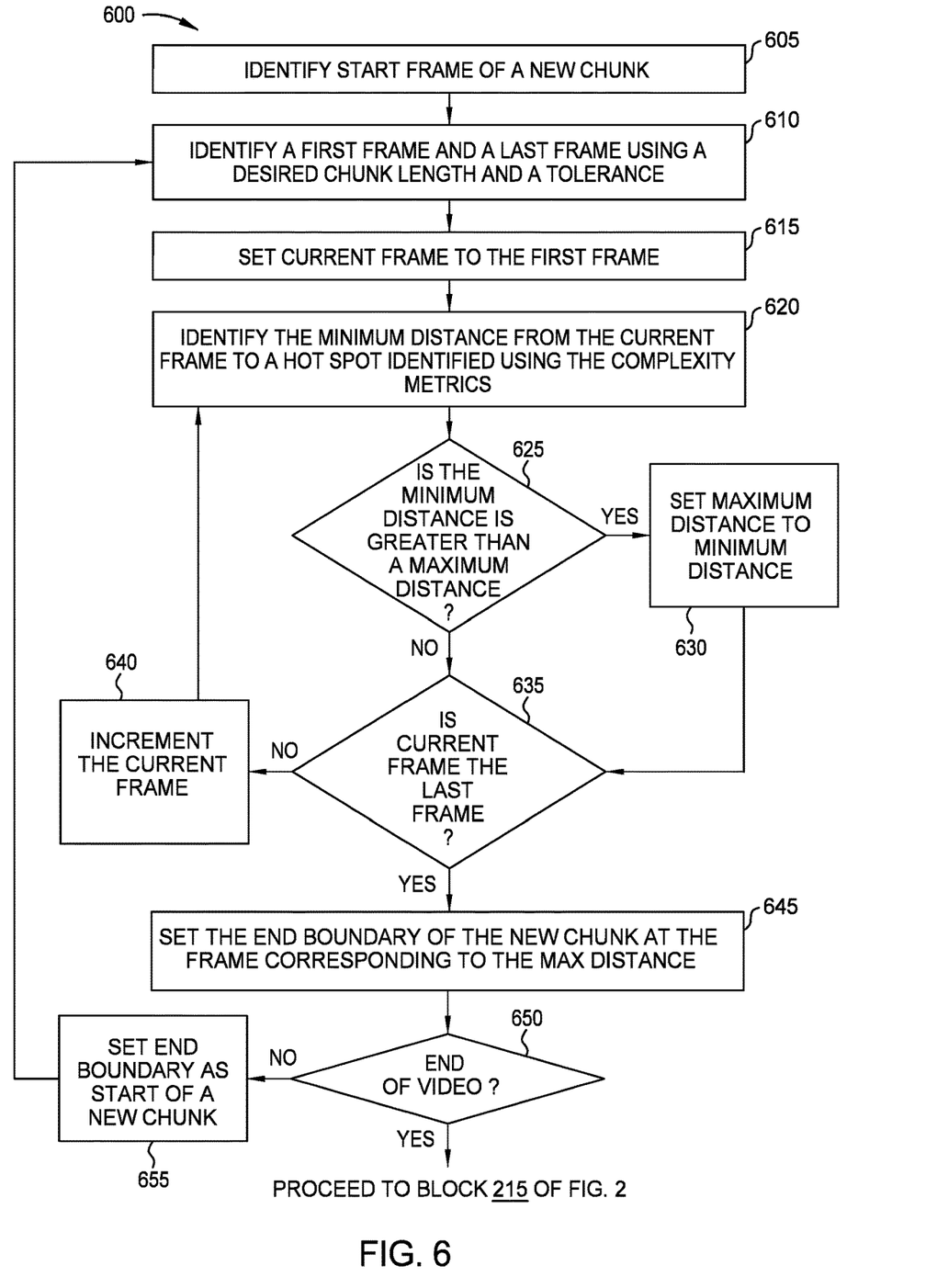
FIG. 6 is a flowchart for identifying boundaries for dividing a video into chunks, according to one embodiment described herein.
Figure 7:
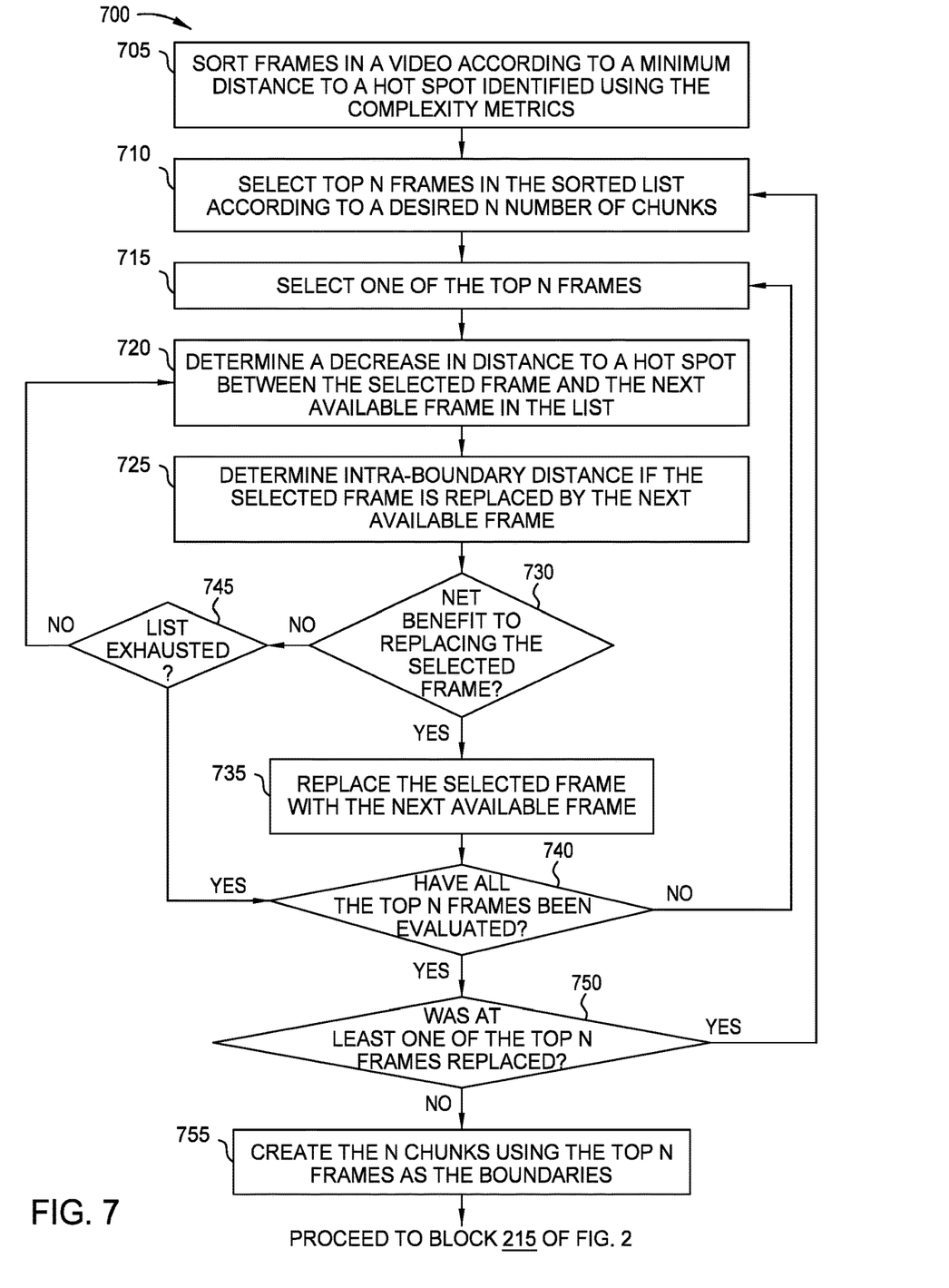
FIG. 7 is a flowchart for identifying boundaries for dividing a video into chunks, according to one embodiment described herein.

Details for identifying the boundaries of the chunks are described in more detail in FIGS. 6 and 7 which illustrate different techniques for dividing a video in different chunks.

At block 215, the transcoders encode the plurality of chunks in parallel. The transcoders can execute on different computing systems (e.g., different servers) or on the same computing system (e.g., on different processors or cores in the same computing system). As mentioned above, it may be preferred that the chunks are close to the same length since this may speed up the overall encoding process, but this is not a requirement.

At block 220, a merging module combines the encoded chunks into a new encoded video that has been converted into a different encoding scheme. Moreover, because the boundaries of the chunks were set by considering the complexity metrics, combining the chunks does not result in a reduction in the visual quality when compared to dividing the video into chunks with a fixed duration.

Figure 5:
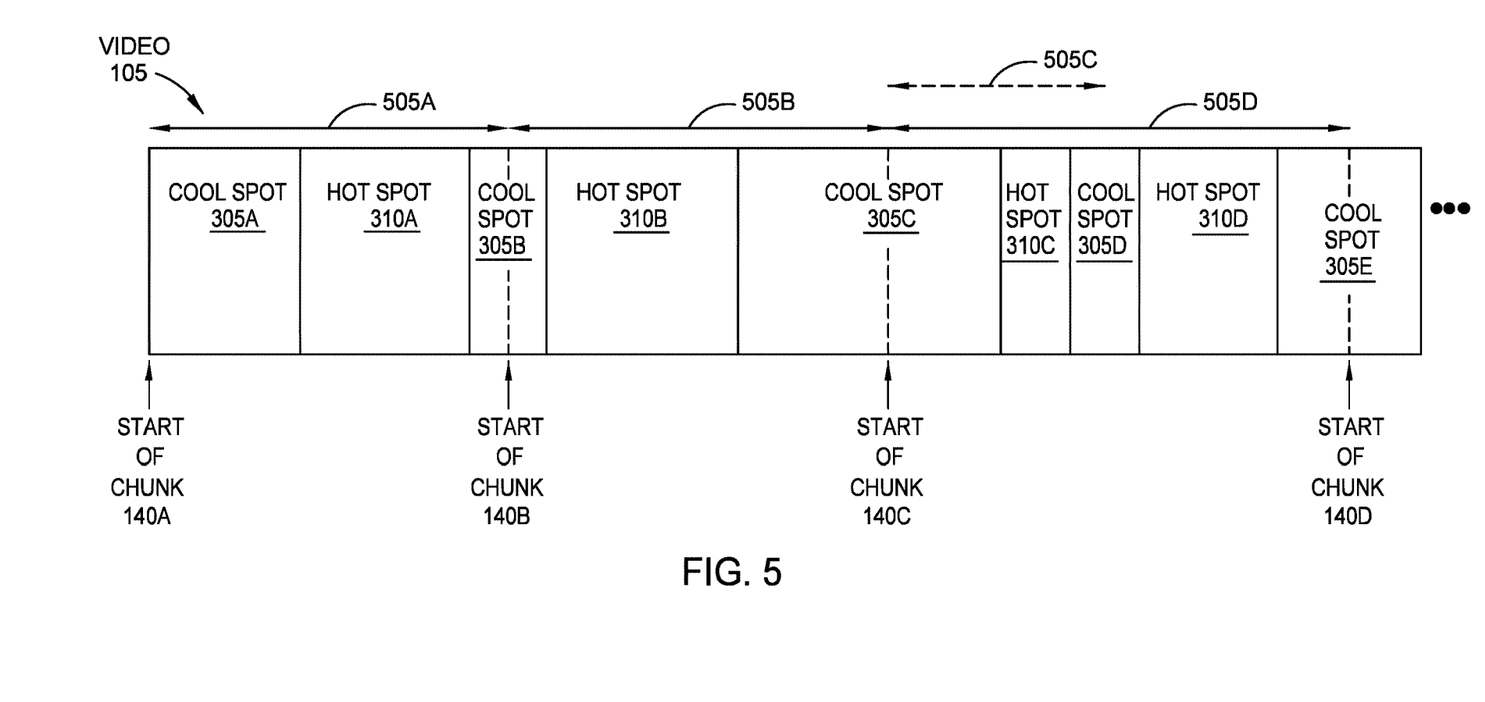
FIG. 5 illustrates dividing a video into chunks having various lengths, according to one embodiment described herein.

FIG. 5 illustrates dividing a video into chunks having various durations, according to one embodiment described herein. For ease of explanation, the frames in the video are grouped together to illustrate various cool spots 305 and hot spots 310 to illustrate the reasoning performed by the boundary identifier when selecting the boundaries (illustrated by the vertical dotted lines). In one embodiment, the location of the boundaries and the durations 505 of the chunks 140A-140D was selected using the method 200.

The chunk 140A starts in the cool spot 305A and includes the frames in the cool spot 305A, the hot spot 310A, and the first half of the frames in the cool spot 305B as illustrated by the duration 505A. The start of the chunk 140B occurs in the middle of the cool spot 305B and includes the frames in the second half of the cool spot 305B, the hot spot 310B, and the first half of the cool spot 305C as illustrated by the duration 505B. The start of the chunk 140C occurs in the middle of the cool spot 305C and includes the frames in the second half of the cool spot 305C, the hot spot 310C, the cool spot 305D, the hot spot 310D and the first half of the cool spot 305E as illustrated by the duration 505D. The chunk 140D starts in the middle of the cool spot 305E and can include additional portions of the video 105 that are not shown in FIG. 5.

Notably, the chunks 140A-140D have different durations 505. In this example, the durations 505 are chosen based on placing the boundaries at (or substantially at) the middle of the cool spots—i.e., cool spot 305B, 305C, and 305E. Because the location of the cool spots is dependent on the underlying video data in the frames, the durations 505 of the chunks 140 vary. Further, in addition to considering the complexity of the data when selecting the boundaries, the length of the durations 505 also influences the selection of the boundaries. This is illustrated by the fact that the cool spot 305D was not selected for a boundary of a chunk. That is, instead of putting the end boundary of the chunk 140C in the cool spot 305D, the boundary identifier instead placed this boundary in the cool spot 305E. For example, putting the end boundary in the cool spot 305D would have resulted in the chunk 140C having a duration 505C, which may increase the fluctuation or variance of chunk duration which might not outweigh the benefit of placing the end of the chunk 140C in the cool spot 305D. Thus, the boundary identifier instead selected the cool spot 305E as the end boundary of the chunk 140C and the start boundary for the chunk 140D. In this manner, both the complexity of the underlying data and the durations of the chunks can be considered when selecting the boundaries.

FIG. 6 is a flowchart of a method 600 for identifying boundaries for dividing a video into chunks, according to one embodiment described herein. In one embodiment, the method 600 is one example of performing block 210 where the boundary identifier identifies boundaries to form a plurality of chunks. Thus, the method 600 may be performed after the complexity detector has derived one or more complexity metrics from a video.

At block 605, the boundary identifier identifies a start frame of a new chunk. The start frame may be the first frame in the video if the method 600 has just begun or can be the first frame following the end of a previous chunk. Generally, the method 600 repeats to identify sequential chunks in the video until the end of the video is reached.

At block 610, the boundary identifier identifies a first frame and a last frame using a desired chunk length and a tolerance. In one embodiment, the desired chunk length and the tolerance are inputs to the boundary identifier used to harmonize the durations of the chunk and can be provided by the user. For example, the user may indicate that the desired chunk length is two minutes (e.g., the number of frames that is equivalent to two minutes of video playtime) but has a tolerance of +/−30 seconds. That is, the chunks can have a duration that varies from 1.5 minutes to 2.5 minutes. In that example, the first frame identified at block 610 would be the frame that is 1.5 minutes from the start frame while the last frame is 2.5 minutes from the start frame. In this manner, the first frame and last frame define a range of potential candidate frames that can serve as the end of the new chunk. Put differently, the desired chunk length and the tolerance are input parameters that limit the possible locations of the end boundary of the new chunk. As such, these input parameters represent a tradeoff between selecting the optimal location of the boundary using the complexity metrics and ensuring the lengths of the chunks are somewhat similar (e.g., within the tolerance) to take advantage of performing encoding in parallel.

At block 615, the boundary identifier sets the current frame to the first frame. As discussed below, the boundary identifier evaluates the first frame as a suitable location for the end boundary and then iterates through the remaining frames until reaching the last frame. However, it is equally valid to set the last frame as the current frame and then iterate through the previous frames until reaching the first frame.

At block 620, the boundary identifier identifies the minimum distance from the current frame to a hot spot identified using the complexity metrics. That is, the boundary identifier can start at the current frame and then move backwards and forwards along the timeline and evaluate the frames on either side of the current frame until reaching a frame that falls within a neighboring hot spot (e.g., the closest hot spot). The boundary identifier can then count the frames between the current frame and the closest frame in a hot spot which results in the minimum distance.

In one embodiment, the boundary identifier may have already, before performing block 620, determined which frames in the video are in hot spots and which are in the cool spots. That is, the boundary identifier may have already generated a heat map indicating which frames are in the hots spots so it can identify the minimum distance between the current frame and a hot spot. If the current frame is in a hot spot, that distance would be zero. However, if the current frame is in a cool spot, the minimum distance would be a non-zero count or value.

However, the boundary identifier does not need to have previously generated a heat map to perform block 620. For example, the boundary identifier could evaluate the frames in real time using the complexity metrics to determine whether the frames are in a hot spot. For example, if a frame corresponds to a luminance value that exceeds a threshold, or has a difference frame energy indicating there was a scene cut, the boundary identifier can determine the frame is in a hot spot. The boundary identifier can consider the complexity metrics independently (e.g., only one metric has to indicate that a frame is part of a hot spot) or can weight each of the complexity metrics and consider the weighted metrics as a whole to determine whether a frame is in a hot spot (e.g., if the weighted combination of the metrics exceeds a threshold).

At block 625, the boundary identifier determines whether the minimum distance is greater than a maximum distance. The maximum distance is a global variable that tracks the frame that is the furthest from a hot spot as the method 600 iterates between the first frame and the last frame. Put differently, as the boundary identifier iterates through the range defined by the first and last frames, it stores in the maximum distance the frame that has the largest minimum distance to a hot spot (i.e., the frame that is the furthest from the hot spot when considering both the forward and backward directions). Each time the method 600 is repeated to identify a new chunk, the maximum distance is reset (e.g., set to an initial value of zero).

If the minimum distance for the current frame is greater than the maximum distance for frames other than the current frame, this means the current frame is the furthest from a hot spot in the forward and reverse directions than any frames method 600 have iterated over at this point. The method 600 then proceeds to block 630 where the boundary identifier sets the maximum distance to the value of the minimum distance for the current frame. That is, the value of the minimum distance becomes the new value of the maximum distance which is then compared to the next frame (assuming the current frame is not the last frame).

However, if the maximum distance is greater than the minimum distance, the method 600 proceeds to block 635 where the boundary identifier determines whether the current frame is the last frame. That is, the boundary identifier does not change the maximum distance and determines whether it has evaluated all the frames between the first and last frames identified at block 610. If not, the method 600 proceeds to block 640 where the current frame is incremented and blocks 620-635 repeat.

If the current frame is the last frame, this indicates the boundary identifier has evaluated all the frames within the range identified at block 610. In that case, the method 600 proceeds to block 645 where the boundary identifier sets the end boundary of the new chunk at the frame corresponding to the maximum distance. That is, when updating the maximum distance at block 630, the boundary identifier notes which frame corresponds to the current value stored in the maximum distance. Thus, after evaluating all the frames in the range, the boundary identifier can identify the frame best suited (e.g., is in, or close to, the middle of the cool spot) to serve as the end boundary for the new chunk.

At block 650, the boundary identifier determines whether the video is at the end. For example, if the remaining frames in the video following the end boundary set at block 645 are less than or equal to the desired chunk length, the boundary identifier may simply designate these frames as the last chunk (without repeating the method 600) and proceed to block 215 of FIG. 2.

However, if the video is not at an end (e.g., there are sufficient remaining frames to make more than one chunk), the method 600 proceeds to block 655 where the boundary identifier sets the end boundary as a start of a new chunk and then returns to block 610 where the method 600 can repeat to identify the optimal end boundary for the new chunk. Moreover, the boundary identifier may reset the maximum distance. In this manner, the method 600 can identify end boundaries that are furthest from a hot spot (assuming the range identified at block 610 by the first and last frames has at least one cool spot). If all the frames in the range are deemed complex for encoding (e.g., are in a hot spot), the boundary identifier may select the frame that is the least complex relative to the other frames in the range, or simply select the frame at the middle of the range, to serve as the boundary.

FIG. 7 is a flowchart of a method 700 for identifying boundaries for dividing a video into chunks, according to one embodiment described herein. Like the method 600, the method 700 is another example of performing block 210 where the boundary identifier identifies boundaries to form a plurality of chunks. Thus, the method 700 may be performed after the complexity detector has derived one or more complexity metrics from a video.

At block 705, the boundary identifier sorts frames in a video according to a minimum distance to a hot spot identified using the complexity metrics. For ease of explanation, assume a video has 1,000 frames (although most videos include many more frames than this). The boundary identifier evaluates each of these frames to identify the minimum distance (e.g., the number of frames) between the current frame and neighboring hot spots in the forward and backward directions in the video. For example, assume that the boundary identifier is evaluating the $500^{th}$ frame in the video and the complexity metrics indicate there is a hot spot at the $400^{th}$ frame and the $550^{th}$ frame. In that case, the distance is 100 frames in the backward direction and 50 frames in the forward direction. The minimum distance for the current frame would by 50 frames (i.e., the distance to the hot spot in the forward direction since it is the closest. This minimum distance is calculated for each frame in the video. If a frame is in a hotspot, the minimum distance would be zero.

Once the minimum distances are identified, the boundary identifier then sorts the frames, for example, in descending order. In this manner, the 1,000 frames in the video have now been sorted according to their distance relative to the hot spot where the frames furthest from the hot spots (i.e., the frames with the largest minimum distances) are sorted at the top of the list.

At block 710, the boundary identifier selects a top N frames in the sorted list according to a desired N number of chunks. In one embodiment, the user sets the value of N which determines the number of chunks that the boundary identifier creates. For example, the value of N may be determined by a desired target length of the chunks (e.g., two minute chunks). The duration of the video can be divided by the desired target length to yield the value of N (with some rounding).

Once the value of N is identified, the boundary identifier selects the top N frames (e.g., 10 out of the 1000 frames in the video) that have the largest minimum distances to hot spots when considering hot spots in the forward and backward directions. These top N candidate frames are the initial candidate locations of the boundaries of the segments. While these frames are the best locations when it comes to maximizing the distance from hot spots, they may not be the best locations when it comes to making sure each of the segments have similar durations. For example, if the top N candidate frames were used as the chunk boundaries, one chunk may be 150 frames, another may be 15 frames, another may be 250 frames, another may be 23 frames, and so forth. The following blocks of the method 700 describe a technique for balancing the desire to place boundaries the furthest from hot spots with the desire to ensure the chunks have similar lengths to take advantage of encoding the chunks in parallel.

At block 715, the boundary identifier selects one of the top N candidate frames (e.g., one of the 10 frames in the video with the greatest minimum distances). In one embodiment, the boundary identifier selects the frame randomly from the set of top N frames. In the discussion below, assume the $7^{th}$ frame was randomly selected from the top 10 candidate frames in the sorted frames.

At block 720, the boundary identifier determines a decrease in distance to a hot spot between the selected frame and the next available frame in the sorted list of frames. If this is the first iteration of the method 700, the next available frame in this example is the $11^{th}$ frame in the sort list. Since the frames are sorted in descending order based on distances of the frames from hotspots, by design, the minimum distance of the $11^{th}$ frame is less than or equal to the minimum distance of the $7^{th}$ frame. Thus, subtracting the minimum distance of the $7^{th}$ frame from the minimum distance of the $11^{th}$ frame yields a number that is greater than or equal to zero. This value indicates the separation distance that is lost between a boundary and a hot spot (which is undesirable) if the $11^{th}$ frame were swapped with the $7^{th}$ frame in the sorted list of frames.

At block 725, the boundary identifier determines an intra-boundary distance if the selected frame is replaced by the next available frame—e.g., if the $7^{th}$ frame was swapped with the $11^{th}$ frame in the list such that the $11^{th}$ frame is a candidate location for a chunk boundary, while the $7^{th}$ frame is no longer a candidate. That is, the boundary identifier determines the size or duration of the chunks if the $11^{th}$ frame is used as a boundary rather than the $7^{th}$ frame. The boundary identifier can use the top N candidate frames (including the $11^{th}$ frame but excluding the $7^{th}$ frame) as boundaries and evaluate the durations of the resulting chunks. In one embodiment, the boundary identifier can measure the standard deviation of the durations of the chunks to determine their variability. For example, a high standard deviation indicates the durations of the chunks change significantly while a low standard deviation indicates the durations are relatively similar. In any case, the intra-boundary distance (or durations) of the chunks can increase, decrease, or remain the same (although this is unlikely) when replacing the selected frame with the next available frame in the top N candidate frames.

At block 730, the boundary identifier determines whether there is a net benefit to replacing the selected frame with the next available frame. To do so, the boundary identifier compares the decrease in distance identified at block 725 to the intra-boundary distance identified at block 725. If there is a net benefit with making the replacement—i.e., the positive gains to the inter-boundary distance resulting from swapping the $11^{th}$ frame with the $7^{th}$ frame outweigh the negative gains caused by the decrease in distance to a hot spot resulting from the swamp—the method proceeds to block 735 where the selected frame is replaced by the next available frame. For example, if the improvement to the standard deviation of the duration of the chunks when swapping the frames outweighs the loss of the separation distance between a boundary and a hot spot, then the boundary identifier replaces the selected frame with the next available frame in the top N candidate frames.

Otherwise, the method 700 proceeds to block 745 where the boundary identifier determines whether the sorted list has been exhausted. That is, the boundary identifier determines whether the selected frame (the $7^{th}$ frame) has been compared to all the remaining frames in the sorted list (e.g., frames 11-1000). If not the method 700 returns to block 720 where the selected frame (the $7^{th}$ frame) is compared to the next available frame (i.e., the $12^{th}$ frame since the $11^{th}$ frame was previously compared) using blocks 720-730.

However, if the sorted listed has been exhausted (the boundary identifier has compared the $7^{th}$ frame to all the remaining frames—i.e., frames 11-1000) or the selected frame is replaced by one of the frames not in the top N candidates, the method proceeds to block 740 where the boundary identifier determines whether all the top N candidate frames have been evaluated. That is, whether blocks 720-745 have been performed for all 10 frames of the top N frames. If not, the method 700 returns to block 715 where the boundary identifier again randomly selects one of the top N candidates which has not yet been evaluated. For example, since the $7^{th}$ frame was already selected, the boundary identifier randomly selects a frame from the 1-6 and 8-10 frames. The boundary identifier can then perform the same analysis above by comparing the selected frame to the next available frames until all the next available frames have been evaluated or the frame has been swapped out with one of the next available frames. In one embodiment, once one of the top N candidates has been removed, it is not then reconsidered to be brought back into the top N candidates during future iterations (e.g., when other top N candidates are being evaluated).

Assuming the top N candidates have all been evaluated, the method 700 proceeds to block 750 where the boundary identifier determines whether at least one of the top N frames was replaced. That is, the boundary identifier may maintain a global variable that is set to TRUE whenever one of the top N candidate frames is replaced with one of the remaining frames in the sorted list of frames. Thus, so long as one of the original top N candidates identified at block 710 was replaced when repeating blocks 715-745, the method returns to block 710 where the method 700 repeats. That is, the new top N candidates (which contain at least one new frame that replaced one of the original top N candidate frames) are evaluated. That is, each of the top N candidate frames can be evaluated using blocks 720-745. If anyone of those candidates is swapped out with one of the next available frames, the global variable is set to TRUE and the new set of top N candidates is again reevaluated.

Eventually, the top N candidate frames are evaluated with the remaining frames and none are swapped out. In that case, the method proceeds to block 755 where the boundary identifier creates the N chunks using the top N candidate frames as the boundaries. That is, the top N candidate frames serve as boundaries of the chunks and represent a tradeoff between maximizing the distance from the boundaries to the hot spots and harmonizing the durations of the chunks.

One advantage of the method 700 over the method 600 is that method 700 considers the chunks as a whole rather than chunking up the video sequentially where the duration of each chunk is considered independently of the other chunks. As a result, the method 700 can identify situations where a boundary should be moved which would help to improve one chunk even though it may harm another chunk (i.e., a net benefit). For example, shrinking the duration of one chunk may mean that one of its boundaries is closer to a hot spot, but this may increase the duration of another chunk to increase the value of performing encoding in parallel, which results in an overall improvement of the encoding process.

A non-limiting advantage of the techniques described above is that the embodiments are content adaptive where the video content is analyzed before cutting/transcoding and used to identify a unique solution to boundary placement. Another non-limiting advantage is the embodiments above can generate chunks beginning at an easy-to-encode region (a cool spot) while maintaining a relative similar chunk length. Another non-limiting advantage of the embodiments above is that users need only specify target chunk length and tolerance (in method 600) or number of chunks (in method 700). Moreover, the embodiments above are self-contained so no other metadata or sidecar data may be needed besides the video itself. Another non-limiting advantage of the embodiments above is their execution speed and can be implemented in the analysis pass of the encoding/transcoding process and takes negligible cycles to execute.

In the current disclosure, reference is made to various embodiments. However, it should be understood that the present disclosure is not limited to specific described embodiments. Instead, any combination of the features and elements discussed above, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method of content-adaptive boundary placement for distributed encoding, the method comprising:
evaluating frames in a received video to identify a complexity metric, wherein the complexity metric represents the complexity of encoding the frames in the received video, and wherein the complexity metric is derived using a machine learning model, the complexity metric comprising at least two of a luminance derived from the frames, a difference derived from the frames, or a statistic derived from the frames, each of the at least two having a different weighting, the complexity metric including the statistic, the statistic including three or more of a quantization statistic, a bitrate statistic, a buffer statistic, an encoding statistic, or a frame cost statistic, wherein:
the quantization statistic comprises a quantization parameter fluctuation,
the bitrate statistic comprises a bitrate factor,
the buffer statistic comprises a buffer state,
the encoding statistic comprises a macroblock encode time, and
the frame cost statistic comprises a frame cost ratio;
generating, based on the complexity metric, a complexity heat map specifying one or more hot spots in the received video, each hot spot comprising at least one frame predicted by the complexity metric to satisfy a complexity criterion comprising a count of bits to encode the at least one frame, wherein each of the three or more statistics is used in generating the complexity heat map;
increasing bitrate-control efficiency in encoding a plurality of chunks, by reducing incidence of the one or more hot spots being encoded across chunk boundaries, wherein the incidence is reduced by permitting chunk lengths of the plurality of chunks to vary when the plurality of chunks is formed;
sacrificing, in favor of increased parallelism when multiple encoders encode the chunks in parallel, a further increase in the bitrate-control efficiency, by restricting the chunk lengths from varying beyond a tolerance, wherein the plurality of chunks is formed by identifying boundaries in the received video based on the complexity heat map, a desired chunk length, and the tolerance, comprising, for each frame in a range of frames identified in the received video using the desired chunk length and the tolerance, identifying a minimum distance to a closest frame of a neighboring hot spot in a backward or forward direction in a timeline of the received video, wherein an end boundary of a first chunk is set at the frame in the range of frames that has the largest minimum distance;
encoding the plurality of chunks in parallel by a plurality of encoders of the multiple encoders and with a higher measure of parallelism than absent the varying being restricted, the chunk lengths varying within the tolerance, the encoding comprising distributed encoding, wherein each of the plurality of encoders is configured to perform an analysis pass and an encoding pass as part of a multi-pass encoder pipeline; and
combining the encoded chunks to form an encoded video.

2. The method of claim 1, wherein the luminance comprises at least one of an average luminance associated with the frames or a variance of luminance associated with the frames, wherein the difference comprises at least one of a frame difference associated with the frames or a histogram difference associated with the frames, and wherein the statistic comprises encoding statistics data derived from the analysis pass.

3. The method of claim 1, further comprising:
identifying a different complexity metric from evaluating the frames;
determining a weighted combination of the complexity metric and the different complexity metric, wherein the identifying the boundaries in the received video to form the plurality of chunks is performed based on the weighted combination.

4. The method of claim 1, wherein identifying the minimum distance comprises:
identifying a first neighboring hot spot in the backward direction in the timeline of the received video relative to a current frame of the range of frames;
identifying a second neighboring hot spot in the forward direction in the timeline of the received video relative to the current frame; and
setting the minimum distance based on which one of the first or second neighboring hot spots has a closest frame with a shorter distance to the current frame.

5. The method of claim 1, wherein identifying boundaries in the received video to form the plurality of chunks based on the complexity metric further comprises:
identifying a start frame of a second chunk based on the end boundary of the first chunk;
identifying a second range of frames in the received video using the desired chunk length and the tolerance, wherein the second range of frames comprises second candidate locations for placing an end boundary of the second chunk;
for each frame in the second range of frames, identifying the minimum distance to a neighboring hot spot; and
setting the end boundary of the second chunk at the frame in the second range of frames that has the largest minimum distance.

6. A non-transitory computer readable medium containing computer program code that, when executed by operation of one or more computer processors, performs an operation for content-adaptive boundary placement for distributed encoding, the operation comprising:
evaluating frames in a received video to identify a complexity metric, wherein the complexity metric represents the complexity of encoding the frames in the received video, and wherein the complexity metric is derived using a machine learning model, the complexity metric comprising at least three of a luminance derived from the frames, a difference derived from the frames, or a statistic derived from the frames, each of the at least three having a different weighting, the complexity metric including the statistic, the statistic including two or more of a quantization statistic, a bitrate statistic, a buffer statistic, an encoding statistic, or a frame cost statistic, wherein:
the quantization statistic comprises a quantization parameter fluctuation,
the bitrate statistic comprises a bitrate factor
the buffer statistic comprises a buffer state,
the encoding statistic comprises a macroblock encode time, and
the frame cost statistic comprises a frame cost ratio;
generating, based on the complexity metric, a complexity heat map specifying one or more hot spots in the received video, each hot spot comprising at least one frame predicted by the complexity metric to satisfy a complexity criterion comprising a count of bits to encode the at least one frame, wherein each of the two or more statistics is used in generating the complexity heat map;
increasing bitrate-control efficiency in encoding a plurality of chunks, by reducing incidence of the one or more hot spots being encoded across chunk boundaries, wherein the incidence is reduced by permitting chunk lengths of the plurality of chunks to vary when the plurality of chunks is formed;

sacrificing, in favor of increased parallelism when multiple encoders encode the chunks in parallel, a further increase in the bitrate-control efficiency, by restricting the chunk lengths from varying beyond a tolerance, wherein the plurality of chunks is formed by identifying boundaries in the received video based on the complexity heat map, a desired chunk length, and the tolerance, comprising:, for each frame in a range of frames identified in the received video using the desired chunk length and the tolerance, identifying a minimum distance to a closest frame of a neighboring hot spot in a backward or forward direction in a timeline of the received video, wherein an end boundary of a first chunk is set at the frame in the range of frames that has the largest minimum distance;

encoding the plurality of chunks in parallel by the multiple encoders and with a higher measure of parallelism than absent the varying being restricted, the chunk lengths varying within the tolerance, the encoding comprising distributed encoding, wherein each of the plurality of encoders is configured to perform an analysis pass and an encoding pass as part of a multi-pass encoder pipeline; and combining the encoded chunks to form an encoded video.

7. The non-transitory computer readable medium of claim 6, wherein identifying the minimum distance comprises:

identifying a first neighboring hot spot in the backward direction in the timeline of the received video relative to a current frame of the range of frames;

identifying a second neighboring hot spot in the forward direction in the timeline of the received video relative to the current frame; and setting the minimum distance based on which one of the first or second neighboring hot spots has a closest frame with a shorter distance to the current frame.

8. A system for content-adaptive boundary placement for distributed encoding, the system comprising:

a processor; and memory configured to store an application, wherein, when executed by the processor, the application performs an operation comprising:

evaluating frames in a received video to identify a complexity metric, wherein the complexity metric represents the complexity of encoding the frames in the received video, and wherein the complexity metric is derived using a machine learning model, the complexity metric comprising at least three of a luminance derived from the frames, a difference derived from the frames, or a statistic derived from the frames, each of the at least two having a different weighting, the complexity metric including the statistic, the statistic including three or more of a quantization statistic, a bitrate statistic, a buffer statistic, an encoding statistic, or a frame cost statistic, wherein:

the quantization statistic comprises a quantization parameter fluctuation, the bitrate statistic comprises a bitrate factor the buffer statistic comprises a buffer state, the encoding statistic comprises a macroblock encode time, and the frame cost statistic comprises a frame cost ratio;

generating, based on the complexity metric, a complexity heat map specifying one or more hot spots in the received video, each hot spot comprising at least one frame predicted by the complexity metric to satisfy a complexity criterion comprising a count of bits to encode the at least one frame, wherein each of the two or more statistics is used in generating the complexity heat map;

increasing bitrate-control efficiency in encoding a plurality of chunks, by reducing incidence of the one or more hot spots being encoded across chunk boundaries, wherein the incidence is reduced by permitting chunk lengths of the plurality of chunks to vary when the plurality of chunks is formed;

sacrificing, in favor of increased parallelism when multiple encoders encode the chunks in parallel, a further increase in the bitrate-control efficiency, by restricting the chunk lengths from varying beyond a tolerance, wherein the plurality of chunks is formed by identifying boundaries in the received video based on the complexity heat map, a desired chunk length, and the tolerance, comprising, for each frame in a range of frames identified in the received video using the desired chunk length and the tolerance, identifying a minimum distance to a closest frame of a neighboring hot spot in a backward or forward direction in a timeline of the received video, wherein an end boundary of a first chunk is set at the frame in the range of frames that has the largest minimum distance;

encoding the plurality of chunks in parallel by a plurality of encoders of the multiple encoders and with a higher measure of parallelism than absent the varying being restricted, the chunk lengths varying within the tolerance, the encoding comprising distributed encoding, wherein each of the plurality of encoders is configured to perform an analysis pass and an encoding pass as part of a multi-pass encoder pipeline; and combining the encoded chunks to form an encoded video.

9. The method of claim 1, wherein identifying the boundaries based on the complexity metric causes the chunks to be encoded with a higher measure of bitrate-control efficiency and a lower incidence of gaps in visual quality, than identifying the boundaries without regard to any complexity metric;

wherein the desired chunk length is selected to reduce bitrate-control inefficiency associated with an insufficient chunk length;

wherein the luminance comprises at least one of an average luminance associated with the frames or a variance of luminance associated with the frames, wherein the difference comprises at least one of a frame difference associated with the frames or a histogram difference associated with the frames, and wherein the statistic comprises encoding statistics derived from the analysis pass.

10. The method of claim 9, wherein identifying the boundaries based on the desired chunk length causes of chunks to be encoded with a higher measure of parallelism than identifying the boundaries without regard to any desired chunk length;

wherein notwithstanding the reduced incidence of the one or more hot spots being encoded across chunk boundaries, at least one of the one or more hot spot is chunked based on at least one boundary identified within the at least one hot spot, while still avoiding loss in visual quality from encoding, by determining that a plurality of measures of utilization of a video buffer verifier, for chunks defined by the at least one boundary, does not vary beyond a threshold.

11. The method of claim 10, wherein identifying the boundaries based on the tolerance permits tradeoffs between bitrate-control efficiency and parallelism, thereby improving encoding performance relative to identifying the boundaries without regard to any tolerance;

wherein each measure of utilization of the video buffer verifier specifies a rate at which bits are received by a decoder relative to the bits being generated by the plurality of encoders;

wherein the complexity metric comprises the luminance, the difference, and the statistic.

12. The method of claim 11, wherein generating the complexity heat map comprises identifying, based on the complexity metric, a first frame in the received video that satisfies the complexity criterion and a second frame in the received video that does not satisfy the complexity criterion;

wherein the complexity metric is derived based on a computer vision model and the machine learning model, wherein the machine learning model comprises at least one of a binary convolutional neural network, a multi-class convolutional neural network, and a regressor neural network;

wherein the luminance comprises the average luminance and the variance of luminance.

13. The method of claim 12, wherein the difference comprises the frame difference and the histogram difference;

wherein the average luminance is determined by computing a normalized average based on a Y-channel of a YUV color encoding scheme, the YUV color encoding scheme comprising a luminance (Y) and chrominance (UV) color encoding scheme, computing an average of values from the Y-channel; and wherein the variance of luminance is associated with spatial details in the frames, wherein the frame difference represents a deviation in time between sequential frames, wherein the histogram difference comprises a difference between two histograms, each histogram corresponding to a respective frame of the frames.

* * * * *